United States Patent Office 3,149,119
Patented Sept. 15, 1964

3,149,119
3-[4-(5-NITRO-2-FURYL)-2-THIAZOLYLAMINO]-2-OXAZOLIDINONE
Frank Frederick Ebetino, Norwich, N.Y., assignor to The Norwich Pharmacal Company, a corporation of New York
No Drawing. Filed Mar. 7, 1961, Ser. No. 93,883
1 Claim. (Cl. 260—306.8)

This invention relates to new chemical compounds and to processses for the preparation thereof. More particularly this invention is concerned with a new chemical compound 3-[4-(5-nitro-2-furyl) - 2 - thiazolylamino]-2-oxazolidinone having chemotherapeutic activity and represented by the formula:

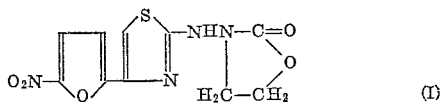

with a new chemical compound 1-(2-oxo-3-oxazolidinyl)-2-thiourea useful in synthesis and represented by the formula:

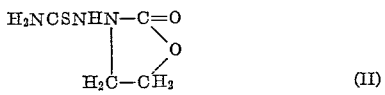

and with processes for the preparation of these compounds.

The new compound of Formula I is distinguished by its chemotherapeutic activity in the prevention and treatment of a broad spectrum of parasitic infections in poultry and animals when administered in far less than toxic amount. Protozoan disesaes in poultry provoked by organisms such as *Histomonas meleagridis* and *Eimeria tenella* are effectively combatted by the administration in the feed supply of from about 0.011–0.022% by weight of this compound. Bacterial infections are readily susceptible to this new compound; for instance, mice lethally infected by *Staphylococcus aureus* or *Salmonella typhosa* are protected from death by the oral administration of as little as 105 mg./kg. Trypanosome infections also yield to this compound; for instance, mice infected with *Trypanosoma foetus* are ridded of this organism by the oral administration of dosages of about 30 mg./kg. over a four-day period. Helminthic infections are similarly susceptible to treatment with this compound; for instance, mice harboring *Syphacia obvelata* are relieved by the administration b.i.d. of 50 mg./kg. for four days.

This compound is relatively non-toxic. In mice the highest tolerated dose of it is greater than 1000 mg./kg. Its administration at a level of 0.022% in the diet of turkeys and chickens has manifested no sign of toxic effect.

The broad antimicrobial therapeutic effectiveness and low toxicity of this compound makes it a valuable medicinal agent.

The new compound represented by Formula II is useful in synthesis. It is valuable as an intermediate in the production of the compound of Formula I. In accordance with this invention it is readily prepared by reacting 3-amino-2-oxazolidone with an alkali thiocyanate such as potassium thioacyanate in an aqueous medium and in the presence of a mineral acid such as hydrochloric. To facilitate its preparation, heat may be supplied to the reaction mixture. The product 1-(2-oxo-3-oxazolidinyl)-2-thiourea is readily recovered by cooling and filtering the reaction mixture.

The compound represented by Formula I is readily prepared by bringing together a halomethyl 5-nitro-2-furyl ketone and the compound represented by Formula II. In accordance with this invention, the process currently preferred consists in mixing bromomethyl 5-nitro-2-furyl ketone and 1-(2-oxo-3-oxazolidinyl)-2-thiourea in an inert medium such as ethanol and heating until reaction is complete. It is advantageous to stir the reaction mixture to bring about good dispersion and contact of the reactants. The reaction mixture is cooled and the product filtered. It may be recrystallized from a suitable solvent such as ethanol, if desired.

The compound represented by Formula I can be compounded in various pharmaceutical forms such as tablets, capsules, suspensions, troches, and the like using excipients and adjuvants common to the art of pharmacy. When used in the veterinary field a convenient form of administration is through admixture in the feed supply.

In order that this invention may be readily available to and understood by those skilled in the art, the following examples are given:

EXAMPLE I

*1-(2-Oxo-3-Oxazolidinyl)-2-Thiourea*

A solution of 3-amino-2-oxazolidone (60 g., 0.6 mole) and potassium thiocyanate (65 g., 0.67 mole) in 125 ml. of water is treated with 50 ml. of concentrated hydrochloric acid and heated on the steam bath for 1½ hours. After cooling, the solid (72.5 g.) is filtered. It may be recrystallized from 1380 ml. of water. The yield of pure material is 62 g. (64%); M.P. 195–196°.

EXAMPLE II

*3-[4-(5-Nitro-2-Furyl)-2-Thiazolylamino]-2-Oxazolidinone*

A mixture of 46.8 g. (0.2 mole) of bromoethyl 5-nitro-2-furyl ketone and 32.2 g. (0.2 mole) of 1-(2-oxo-3-oxazolidinyl)-2-thiourea in 500 ml. of alcohol is refluxed for 1 hour with stirring. After cooling, the yellow solid (53.2 g., M.P. 155–165°) is filtered and recrystallized from 1600 ml. of alcohol. The yield of 3-[4-(5-nitro-2-furyl)-2-thiazolylamino]-2-oxazolidinone is 45.3 g. (77%); M.P. 170–173°.

What is claimed is:
The compound 3-[4-(5-nitro-2-furyl) - 2 - thiazolylamino]-2-oxazolidinone represented by the formula:

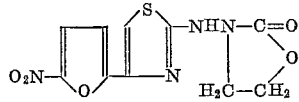

References Cited in the file of this patent
UNITED STATES PATENTS

| | | |
|---|---|---|
| 2,647,905 | Surrey | Aug. 4, 1953 |
| 2,709,172 | Dodson | May 24, 1955 |
| 2,755,285 | O'Neill et al. | July 17, 1956 |
| 2,868,801 | Steele | Jan. 13, 1959 |
| 2,891,962 | Smith et al. | June 23, 1959 |
| 3,004,002 | Kaplan et al. | Oct. 10, 1961 |

OTHER REFERENCES

Degering: "Outline of Organic Nitrogen Comp'ds," p. 459 (1945).
Wiley et al.: "Organic Reactions," vol. VI, pp. 369–373, 378 (1951)
Elderfield: "Heterocyclic Compounds," vol. 5, p. 401 (1957).

UNITED STATES PATENT OFFICE
CERTIFICATE OF CORRECTION

Patent No. 3,149,119 September 15, 1964

Frank Frederick Ebetino

It is hereby certified that error appears in the above numbered patent requiring correction and that the said Letters Patent should read as corrected below.

Column 2, line 37, for "bromoethyl" read -- bromomethyl --.

Signed and sealed this 12th day of January 1965.

(SEAL)
Attest:

ERNEST W. SWIDER
Attesting Officer

EDWARD J. BRENNER
Commissioner of Patents